W. U. DENNISON.
APPARATUS FOR SHAPING ROLLS.
APPLICATION FILED JULY 1, 1908.

939,590.

Patented Nov. 9, 1909.
2 SHEETS—SHEET 1.

WITNESSES
W.W. Swartz
R A Balderson

INVENTOR
Wm. U. Dennison,
by Bakewell, Byrnes & Parmelee,
his Attys.

W. U. DENNISON.
APPARATUS FOR SHAPING ROLLS.
APPLICATION FILED JULY 1, 1908.

939,590.

Patented Nov. 9, 1909.
2 SHEETS—SHEET 2.

WITNESSES
W. W. Swartz
R. A. Balderson

INVENTOR
Wm. U. Dennison,
by Bakewell, Byrnes & Parmelee
his Attys.

UNITED STATES PATENT OFFICE.

WILLIAM U. DENNISON, OF YOUNGSTOWN, OHIO.

APPARATUS FOR SHAPING ROLLS.

939,590.  Specification of Letters Patent.  Patented Nov. 9, 1909.

Application filed July 1, 1908. Serial No. 441,319.

*To all whom it may concern:*

Be it known that I, WILLIAM U. DENNISON, of Youngstown, Mahoning county, Ohio, have invented a new and useful Improvement in Apparatus for Shaping Rolls, of which the following is a full, clear, and exact description, reference being had to the accompanying drawings, forming part of this specification, in which—

Figure 1:
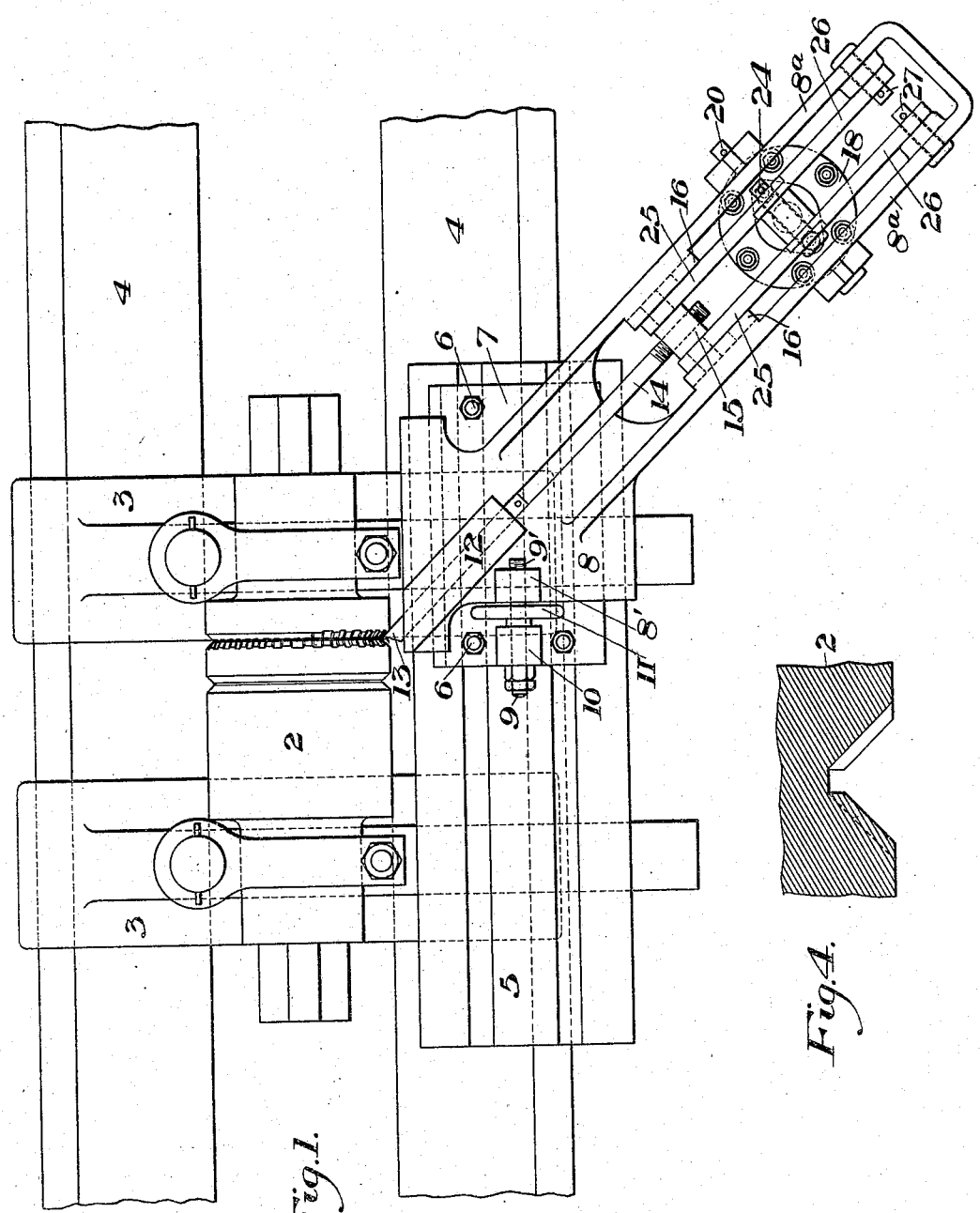
Figure 2:
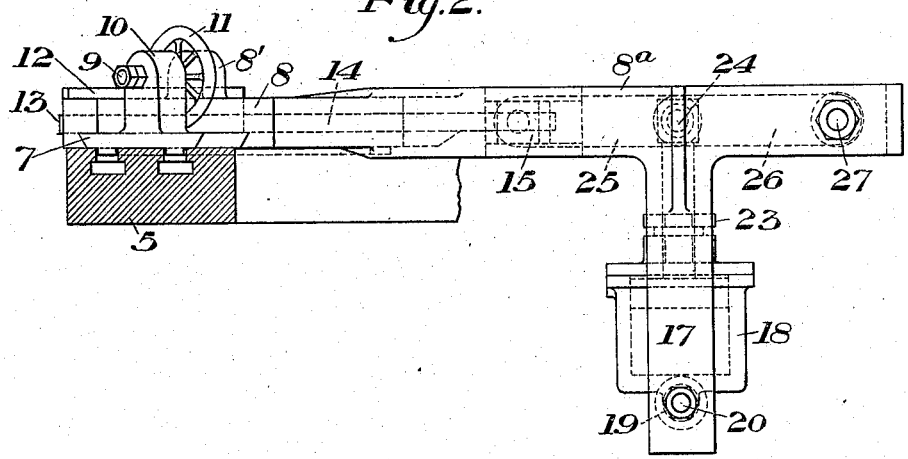
Figure 3:
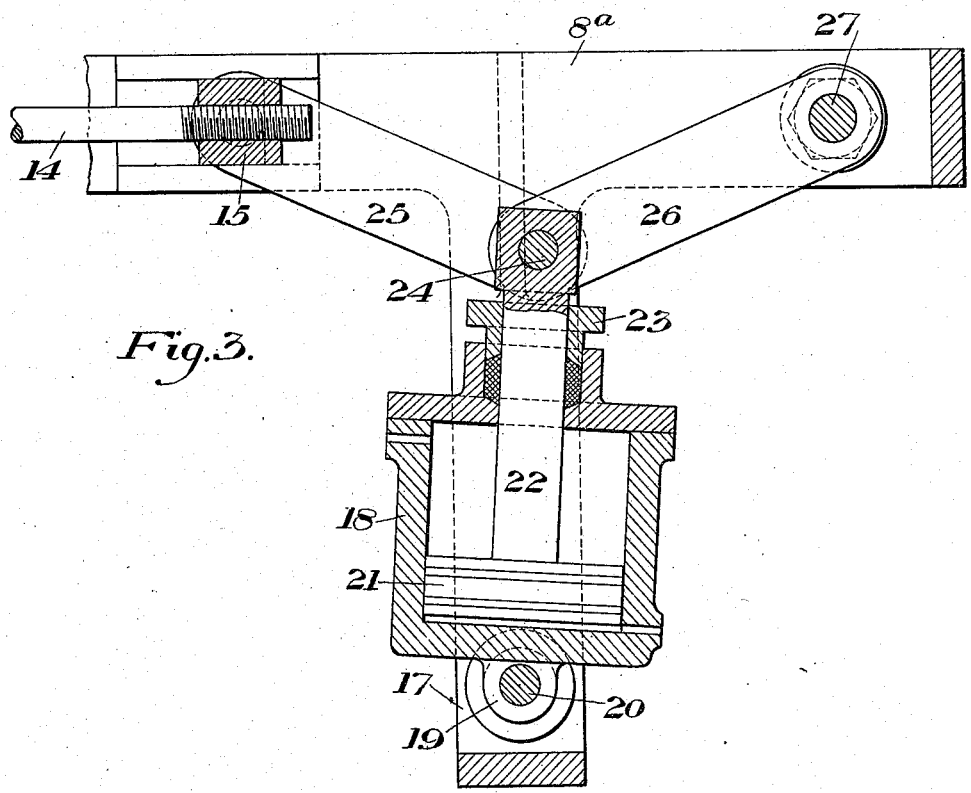

Figure 1 is a top plan view showing my improved roll cutting apparatus as it is applied for use to a roll turning lathe; Fig. 2 is a side elevation of the same; Fig. 3 is a detail longitudinal section on a larger scale, showing the means employed for reciprocating the cutting tool used in cutting the transverse grooves or notches in the rolls; and Fig. 4 is a detail on a larger scale showing the V-shaped annular grooves cut in the faces forming the V-shaped annular grooves in the body of the rolls.

My invention relates to apparatus employed in machining rolls for rolling mills and it more particularly relates to apparatus used in forming the grooves or passes in rolls for making deformed bars used in steel reinforced concrete constructions. Heretofore in forming the passes in such rolls, annular grooves have first been turned in the roll, and the transverse slots or grooves have then been chipped in the side walls of the annular grooves by hand tools. This is a slow, laborious and very expensive operation, and difficulty has been had in accurately forming such transverse slots by hand.

The object of the invention is to provide a simple and effective apparatus by which the forming of such transverse slots or grooves is easily and quickly performed and by which the expense of such operation is greatly reduced, while the slots are formed much more accurately than has been possible in the methods heretofore employed.

The invention consists in providing a reciprocating cutting tool to be used in connection with the forming of the grooves in the rolls, this tool preferably being mounted on the tool rest of the roll lathe although the apparatus may be provided with roll centering means in which the roll is placed after the groove turning operation has been completed in the roll lathe.

In the drawings, 2 represents a roll which is mounted in suitable bearings located in the housings 3, 3 of a roll lathe, these housings being adjustably mounted on the customary shoes 4, 4. Also secured on the housings is a rest bar 5 on which the cutting tools used in turning the rolls are clamped or bolted during the turning operation. The roll 2 shown in the drawings is provided with two peripheral grooves, these grooves registering with similar grooves on a second roll to form the roll pass.

Secured on the rest bar 5 by means of bolts 6 is a base 7 on which a carriage 8 is adjustably mounted. The carriage 8 is arranged to be adjusted on the base 7 in a line parallel with the axis of the roll 2. An adjusting screw 9 is mounted in the boss or flange 10 on the base 7, the threaded end 9' of the screw being inserted in the threaded boss 8' which is provided on the sliding carriage 8. The screw 9 is also provided with a hand wheel 11 by which the screw is turned in adjusting the carriage lengthwise on the support 7. Movably mounted in bearings or ways 12 on the carriage 8 is a reciprocating cutting tool 13, the cutting edge of which extends into proximity to the surface of the roll 2. The opposite end of the cutting tool 13 is connected by a screw-threaded rod or shaft 14 with the reciprocating cross head 15. By means of the screw-threaded connection between the tool and the cross-head the depth of the cut of the tool can be kept constant, irrespective of the amount ground from the end thereof, when sharpening the tool. The carriage 8 has rearwardly extending arms or supports 8$^a$, these supports being provided with slides 16 in which the cross head 15 reciprocates. The supports 8$^a$ have downwardly extending arms 17 on the lower end of which a cylinder 18 is pivotally mounted, the cylinder being secured by the lugs 19 on its lower end to the arms 17 by means of the bolt or pin 20. The cylinder 18 is provided with a piston 21 and piston rod 22, the piston rod 22 extending through the usual stuffing box and gland 23 on the end of the cylinder. The upper end of the piston rod 22 is connected by means of the pin 24 with the ends of the toggle levers 25 and 26. One end of the lever 26 is connected by the pin 27 with the rearward end of the supports 8$^a$ and one end of the toggle lever 25 is connected to the cross head in which cross head the shaft 14 is adjustably secured.

The cutting tool 13 together with the arms 8$^a$ and the tool reciprocating mechanism is mounted on the adjustable carriage 8 at an angle to the axis of the roll so that the cutting tool 13 will be moved in a path which as shown is at an angle of 45° to the axis of the roll and the direction of movement of the adjustable carriage 8, when reciprocated by the piston 21 and connecting mechanism.

In the operation of my improved apparatus, the roll is first machined in the roll-lathe so as to cut any desired number of annular V-shaped grooves in the body of the roll. A deeper annular groove having side walls which are parallel with each other and which are perpendicular to the rolls is also cut in the bottom of the V-shaped grooves, this being clearly shown in Fig. 4.

After the grooves have been turned in the roll 2, the base 7 with its traveling carriage 8 is mounted on the rest bar 5 and the reciprocating cutting tool 13 is then adjusted relatively to the roll so as to be in position to cut the transverse slots in the body of the roll. The cylinder 18 is connected by suitable piping with a source of fluid pressure and suitable valves are provided by which the pressure may be admitted to the opposite ends of the cylinder. After the cutting tool has been adjusted into the desired position by means of the hand wheel 11, the operating valve is thrown into the proper positions to reciprocate the piston 21 in the cylinder 18 and the connecting piston rod through the toggle levers 25 and 26 causes the rod 14 together with the cutting tool 13 to reciprocate in the bearing 12. This operation causes the cutting edge of the roll 13 to take a shaving off one side of the V-shaped groove in the roll. The tool is then adjusted closer to the roll into another cutting position by means of the hand wheel 11 and the piston is again reciprocated in the cylinder 18 so as to advance and retract the cutting tool 13 and remove another shaving from the roll. This operation is repeated as often as is necessary in order to cut the desired depth of transverse slot in the V-shaped groove, the bottom of the transverse slot generally terminating at a point where it intersects with the bottom of the groove and the side wall of the groove having the parallel faces. After the slot has been cut in the groove at this point on the roll, the roll is adjusted to bring it into proper relation with the cutting tool to cut the next transverse slot, when the above described operation is again repeated. After the one side of the V-shaped slot has been provided with the desired number of transverse slots in its face, these slots ordinarily being equally spaced around the periphery of the roll, the roll is turned end for end so as to bring the other slotted face of the V-shaped groove in proper position to be operated upon by the reciprocating cutting tool 13. The operation before described for cutting the transverse slots or grooves is then repeated, when the groove forming the pass is in readiness for use in the rolling mill. These operations may be performed on as many of the V-shaped grooves as are provided in the body of the roll, the number of grooves possible being limited only by the size of the groove and the length of the body of the roll.

The advantages of my invention are many, and will be apparent to those skilled in the art. Instead of a slow hand chipping operation to cut the transverse slots in the V-shaped grooves, the power operated means shown will easily and quickly cut these slots and the cost of performing this cutting operation will be very greatly reduced on account of the fine adjustment possible by means of the hand wheel 11. On account of the constant length of stroke of the cutting tool the slots are formed with much greater accuracy than is possible with hand cutting operation.

Modifications in the arrangement and construction of the apparatus may be made without departing from my invention. The angle of the cutting tool with the axis of the roll may be changed or may be made so as to be adjustable angularly with relation to the roll; the arrangement and construction of the parts forming the reciprocating mechanism may be varied and other changes may be made within the scope of my invention.

I claim:—

1. Apparatus for shaping slots in rolls, comprising a support for the roll, a cutting tool mounted to reciprocate obliquely with relation to the axis of the roll, means for reciprocating the cutting tool, and means for moving said tool along the axis of the roll; substantially as described.

2. Apparatus for shaping slots in rolls, comprising a support for the roll, a cutting tool mounted to reciprocate obliquely with relation to the axis of the roll, means for reciprocating the cutting tool, means for advancing the tool to compensate for wear, and means for moving said tool along the axis of the roll; substantially as described.

In testimony whereof, I have hereunto set my hand.

WILLIAM U. DENNISON.

Witnesses:
A. W. GRIFFITH,
S. L. LACHMAN.